Oct. 30, 1951
B. N. ASHTON
2,572,902
PRESSURE FLUID TYPE FOLLOW-UP SERVOMOTOR
Filed May 15, 1944
3 Sheets-Sheet 1
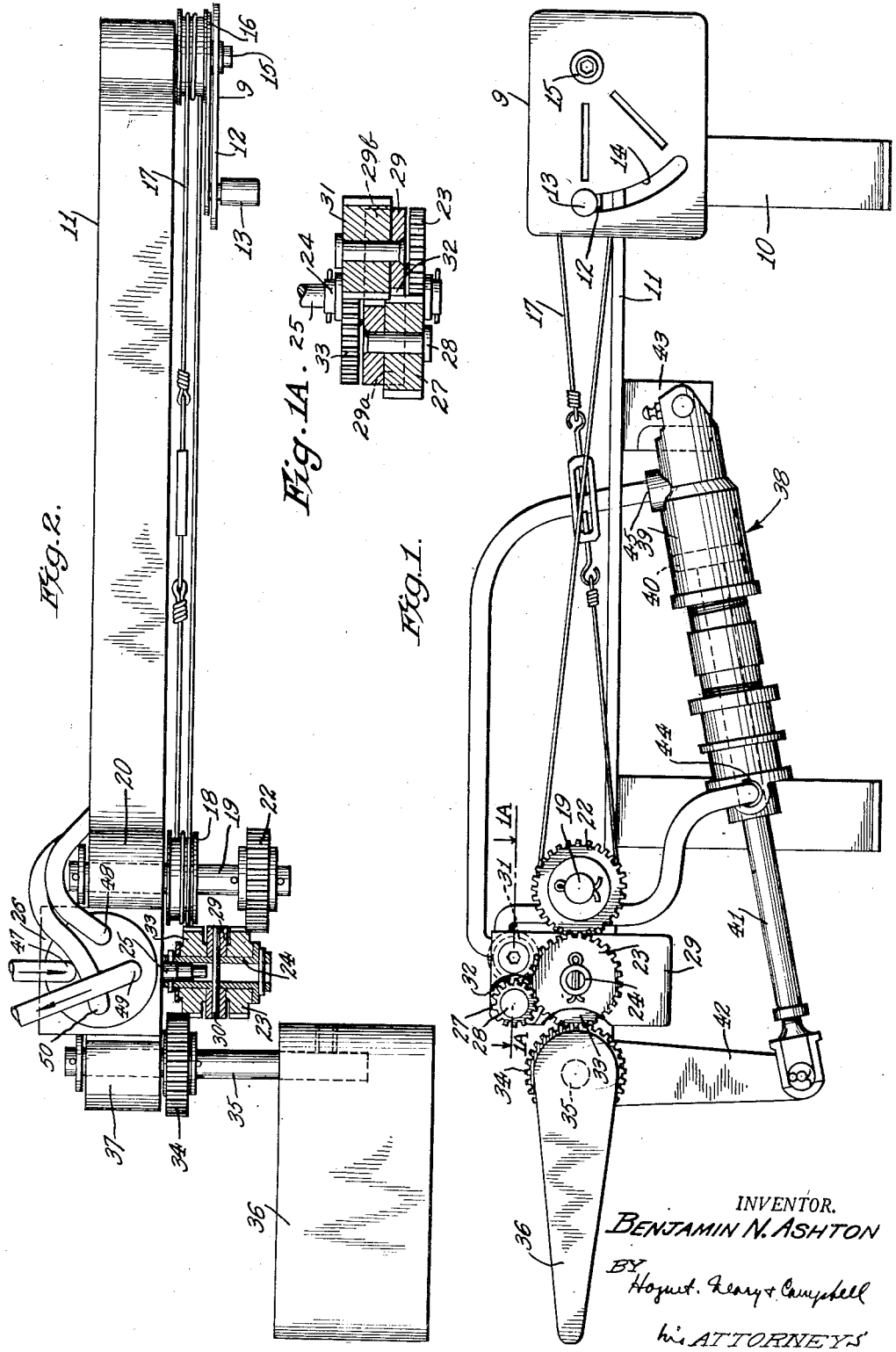
INVENTOR.
BENJAMIN N. ASHTON
BY
Hoguet, Neary & Campbell
his ATTORNEYS

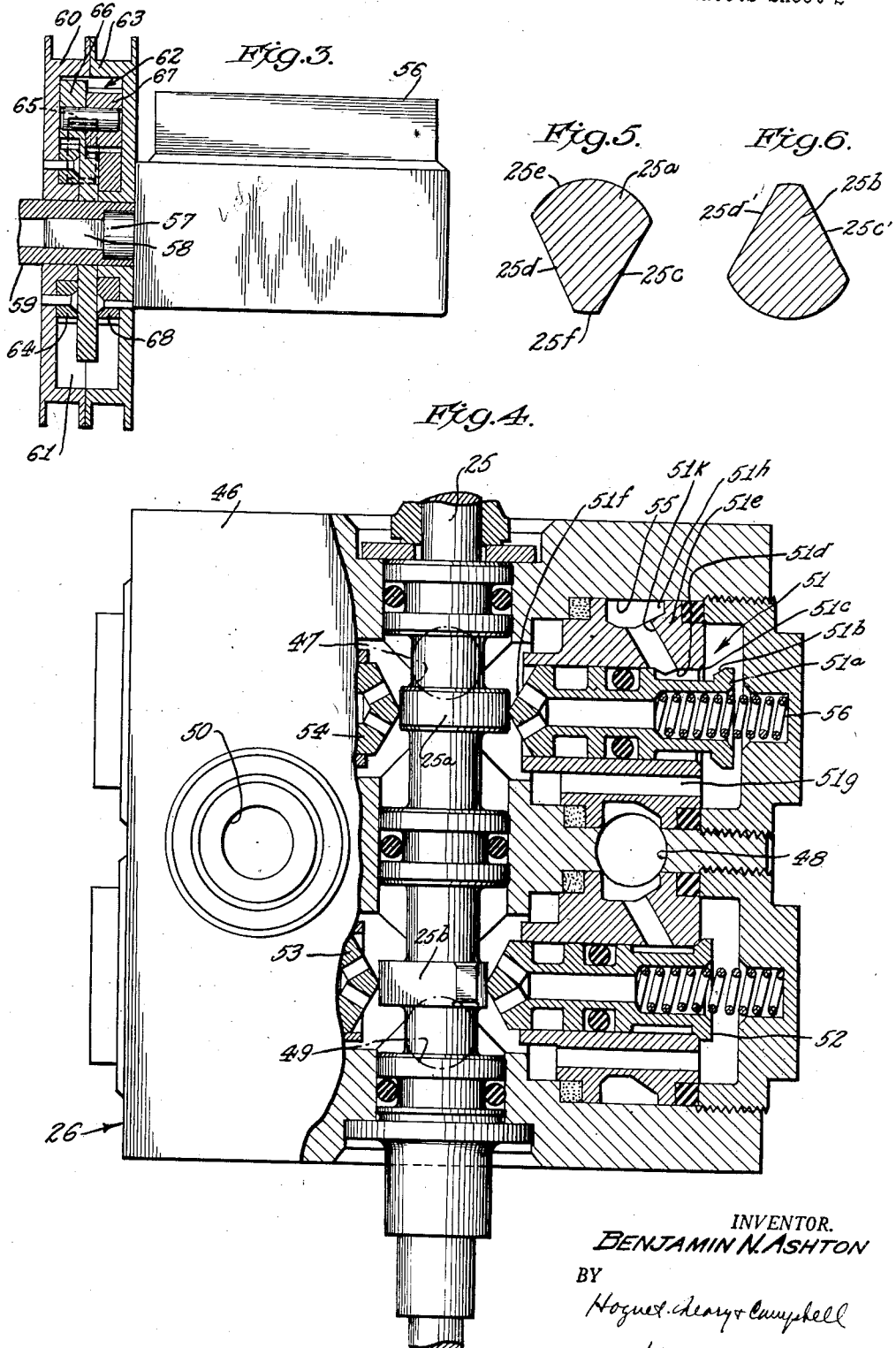

INVENTOR.
BENJAMIN N. ASHTON

Patented Oct. 30, 1951

2,572,902

UNITED STATES PATENT OFFICE 2,572,902

PRESSURE FLUID TYPE FOLLOW-UP SERVOMOTOR

Benjamin N. Ashton, Kingston, N. Y., assignor to Electrol Incorporated, Kingston, N. Y., a corporation of Delaware Application May 15, 1944, Serial No. 535,597

3 Claims. (Cl. 121—41)

1

This invention relates to power control mechanism and relates particularly to a mechanism by means of which the movement of a control mechanism at one point can be duplicated by another mechanism at a point remote therefrom or by means of which elements remote from each other can be moved proportionally. The invention relates particularly to systems for controlling the wing flaps of airplanes.

Substantially all types of high-speed airplanes and those having high load carrying capacity are provided with wing flaps that are used like brakes to control the speed of the airplane. The wing flaps of such planes most commonly are controlled by an hydraulic system inasmuch as such hydraulic systems have been found to be sturdy and are easily installed and serviced in the airplane. Such hydraulic systems have the disadvantage, however, of not being sufficiently flexible in operation to permit partial predetermined adjustments of the wing flaps between their fully closed and fully extended positions without the use of cumbersome and complicated supplemental equipment.

A particular object of this invention is to provide a system that is suitable for controlling and adjusting precisely the angular relationship of the wing flaps with respect to the airplane wings.

Another object of the invention is to provide a control element which will assure the equal displacement of the flaps on the opposite wings of the plane in response to movement of a control lever so that better control over the airplane in flight is obtained.

Another object of the invention is to provide a control device in which movement of a control element may be transmitted to a device for controlling the operation of a motor to drive an element at a remote point and the movement of the element is utilized to bring the motor to a stop when the element has been displaced in a predetermined proportion to the displacement of the control element.

Another object of the invention is to provide a control or "follow up" system in which angular movements of one element are utilized to control the operation of a motor, and the operation of the motor is utilized to bring the motor to a stop after the motor has performed a function corresponding to the angular movement of the element.

Other objects of the invention will become apparent from the following description of typical forms of the devices embodying the present invention.

2

The present invention is characterized by a differential mechanism that is responsive to the movement of a control element to supply energy to a motor for performing an operation. The differential is also responsive to the operation of the motor in a direction counter to the effect of the control element, whereby the motor acts to shut off the supply of energy to the motor after an operation proportional to the movement of the control element.

More particularly, the present invention may be applied to aircraft to control the projection and retraction of wing flaps through any desired angular movement between zero and a maximum. In a typical form of mechanism embodying the invention, the spider of a differential gear system is connected to an actuating member, for example, the camshaft of a selector valve for supplying fluid to an hydraulic motor that moves a wing flap. The differential gears are connected to a control lever and to the wing flaps whereby movement of the lever rocks the spider in one direction and a corresponding movement of the wing flap rocks the spider in the opposite direction. The rocking movement of the spider by the lever opens the selector valve to actuate the motor, and the movement of the flap by the motor rocks the spider to close the valve after the flap has moved an angular distance equal to or proportional to the movement of the lever.

Inasmuch as the movement of the flap is proportional to or equal to the movement of the control lever, depending upon gear ratios and operating connections, the flaps can be adjusted precisely through angles between zero and a predetermined maximum.

The control mechanism embodying the present invention may be utilized for controlling both of the wing flaps of the airplane with the assurance that each of these flaps will be displaced through the same angle regardless of the power supplied to them and even though they may not move at exactly the same rate to their displaced positions.

The invention is not restricted to use with airplane wing flaps or to use with hydraulic flap actuating systems, but may be used for the control of other devices and machines which must be displaced in lineal directions or through angles up to or greater than 360° as will be explained hereinafter.

For a better understanding of the present invention, reference may be had to the accompanying drawings, in which:

Figure 1 is a view in side elevation of a typical form of device embodying the present invention with a wing flap for an airplane disclosed diagrammatically;

Figure 1A is a view in section of the differential mechanism taken on line 1A—1A of Figure 1;

Figure 2 is a plan view of the control mechanism with parts broken away to show details of the differential mechanism thereof;

Figure 3 is a view in section of a modified form of differential control mechanism that is usable for remote control of the movement of an element through angles up to and exceeding 360° displacement;

Figure 4 is a plan view, partly broken away, of a valve suitable for use in an hydraulic system in conjunction with the differential control mechanism;

Figures 5 and 6 are views in cross-section of the camshaft for controlling the operation of the valves in the selector valve unit;

Figure 7:
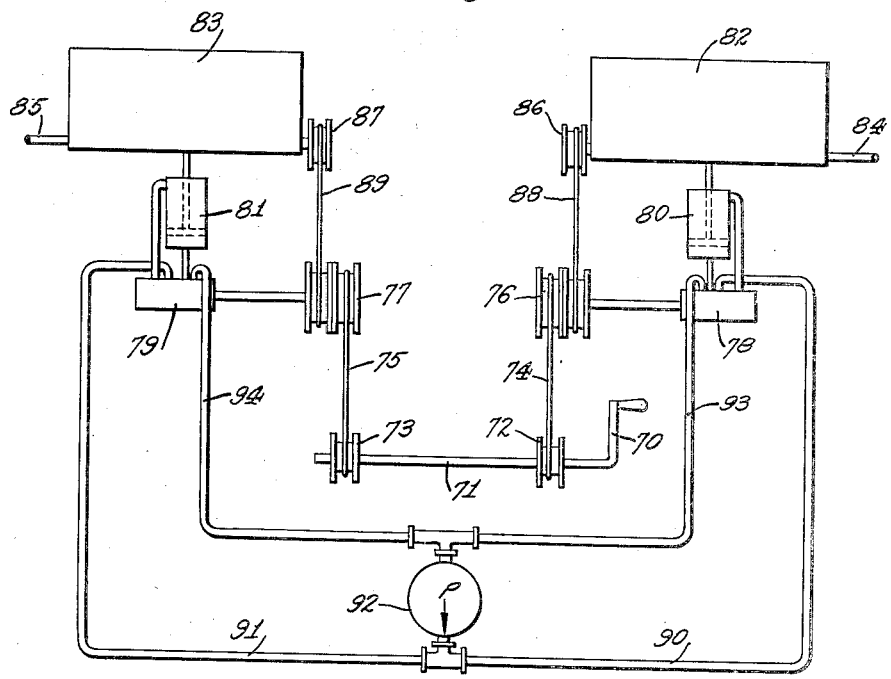
Figure 7 is a diagrammatic showing of a dual control unit for actuating two wing flaps of an airplane.

The invention is illustrated as applied to a control mechanism for the wing flaps of an airplane, but it should be understood that the control mechanism is applicable to many other types of devices, for example, machine tool, gun fire control apparatus and many other control systems wherein hydraulic or electric power is required for operation of the systems.

As illustrated in Figures 1, 1A and 2, a typical form of device embodying the invention may be provided with a control panel 9 that may be suitably positioned in the cockpit of an airplane (not shown). The panel 9 may be supported upon a bracket 10 which is secured thereto and a structural element of the aircraft represented by the plate 11. Pivotally supported upon the panel 9 is a lever 12 that is provided with a handle 13 which projects through an arcuate slot 14 in the panel 9 limiting the angular displacement of the handle. The lever 12 is rotatably mounted on a shaft 15 that is secured to the panel 9.

A pulley 16 is secured to the lever 12 so that it rotates through the same angle as the lever.

The pulley 16 may be connected by means of a flexible cable or belt 17 to a second pulley 18 that is fixed to a shaft 19.

The shaft 19 is rotatably mounted in a bearing 20 that is supported on the plate 11 or in any other desired location. At one end of the shaft 19 is secured a gear 22 which meshes with a gear 23 that is rotatably supported on a tubular shaft 24. The tubular shaft 24 is pinned to or otherwise fixedly connected to an actuating member, the camshaft 25 of a selector valve 26.

The gear 23 is in mesh with a differential pinion 27 that is rotatably mounted by means of a stud bolt 28 on a generally rectangular plate or spider 29. The spider 29 is fixed to the tubular shaft 24 by means of a pin 30 passing through the spider and the shaft.

As shown in Figures 1 and 1A, the differential pinion 27 is in engagement with a second differential pinion 31 mounted on the opposite side of the spider 29 from the pinion 27 through an opening 32 formed by the intersecting recesses 29a and 29b in the opposite sides of the spider 29 on which the pinions 27 and 31 are mounted. The recesses 29a and 29b overlap and are of such depth that they communicate at the zone of overlap to form the opening 32. The inside ends of the teeth of the pinions 27 and 31, therefore, can mesh in the opening 32, as shown in Figure 1A.

The pinion 31 meshes with a differential gear 33 that is rotatably mounted on the tubular shaft 24 and can rotate independently with respect to the shaft 24. The differential gear 33, as illustrated, meshes with a gear 34 that is fixed to the shaft 35 on which a wing flap 36 is mounted. The shaft 35 may be supported for rotation in any suitable way such as, for example, in the bearing 37 secured to the supporting plate 11 or in a rib or spar member of a wing.

The power for moving the wing flap 36 angularly may be supplied by the hydraulic motor 38 which consists of a cylinder 39 having a piston 40 therein. The piston 40 is connected by means of a piston rod 41 to the lever 42 which is secured to the wing flap 36 or the shaft 35, as desired. The opposite end of the cylinder 38 is connected pivotally to a suitable support 43 in the airplane wing or, as illustrated, on the plate 11.

The hydraulic motor 38 has a fluid connection 44 at its left hand end for admission of fluid to displace the piston 40 to the right, as viewed in Figure 1, and a fluid admission port 45 at the right hand end for displacing the piston 40 to the left, as viewed in Figure 1.

The ports 44 and 45 are connected by means of suitable conduits to the selector valve 26 which is of the type disclosed in my copending application Serial No. 426,260, filed Jannuary 9, 1942, now Patent No. 2,349,069, issued May 16, 1944.

The selector valve 26, as best shown in Figure 4, includes a generally square casing 46 having four ports 47, 48, 49 and 50 therein. The port 47 is connected to a high pressure liquid supply, such as, for example, a motor actuated pump or other high pressure hydraulic supply source (not shown). The port 49 is connected with the return to the hydraulic system or to the intake side of the pump for discharge of fluid from the cylinder 39. The port 48 is connected to the port 44 of the cylinder, while the port 50 is connected to the port 45 of the cylinder. The supply of fluid from the port 47 to the opposite sides of the piston in the cylinder 39 is under the control of the four valves 51, 52, 53 and 54, all of which are substantially identical and only one of which will be described herein.

The valve 51, for example, includes a valve plug 51a of the poppet type having a conical head 51b which is adapted to engage a valve seat 51c at the edge of a bore 51d in the valve seat bushing 51e. The bushing 51e is mounted in a bore 55 in the casing. The valve plug 51a extends through the bore 51d and has an inner conical end 51f disposed adjacent to the camshaft 25. The bushing 51e is provided with longitudinal passages 51g through which liquid can be delivered from the port 47 to the outer ends of the bushing 51e and the valve plug 51a. Also, the bushing 51e is provided with a peripheral groove 51h and an inclined passageway 51k providing communication between the bore 51d and the adjacent port 48.

The valve construction described above is balanced inasmuch as fluid pressure is supplied to opposite ends of the valve plug 51a and the effective cross-sectional areas of these ends are the same.

The valve plug 51a is normally urged toward seating position by means of a spring 56. The opposite valves 51 and 54 are so arranged with relation to the camshaft that both of these valves may be closed simultaneously in a neutral position of the camshaft 25 or they may be opened alternately. When the valve 51 is opened, liquid under pressure is supplied from the port 47 to the left hand end of the cylinder, thereby urging the piston to the right, as viewed in Figure 1. The valve 54 which controls the flow of liquid from the port 47 to the right hand end of the cylinder is closed. The valve 52 likewise is closed when the valve 51 is open and the valve 53 is open. Therefore, the port 50 is connected through the open valve 53 to the return conduit 49 permitting the discharge of liquid from the right hand end of the piston 49.

When it is desired to move the piston 40 in the opposite direction, the valves 52 and 54 are opened and the valves 51 and 53 are closed so that the liquid can be introduced into the port 45 from the port 47 through the valve 54 and the port 50 in the selector valve 26 and discharged from the port 45 of the cylinder through the port 48 of the selected valve, the open valve 52 and the port 49 to the return line.

In order to obtain precise movement of the valves, the actuating cam elements 25a and 25b of the camshaft 25 may have the form illustrated in Figures 5 and 6. The cam 25a has two flat converging faces 25c and 25d and the cam 25b has two oppositely converging flat cam faces 25c' and 25d'. The clearances preferably are extremely small so that movement of the valves is obtained by a very slight rotation of the camshaft 25. The remainder of the cam elements 25a, 25b may be of any desired shape inasmuch as they have no effect upon the valves. As illustrated, the larger face 25e of the cam 25a is semi-circular or semi-cylindrical and the smaller face 25f may similarly be curved.

In operation, when the actuating handle 13 is pushed downwardly, the pulley 18 and the gear 22 are rotated in a clockwise direction. Such rotation causes an opposite rotation of the idler differential gear 23. This, in turn, causes an opposite rotation of the differential pinion 28 and because of its reaction on the differential pinion 31 and the gear 33, causes the spider 29 to rotate in counter-clockwise direction. This rotation of the spider 29 rotates the camshaft 25 and because of the arrangement of the cams 25a and 25b thereon causes fluid to be supplied from the selector valve to the port 44 of the hydraulic motor 38, thereby driving the piston to the right. This movement of the piston to the right causes a counter-clockwise deflection of the flap 36 in the same direction of movement as the control handle 13.

Inasmuch as the flap 36 is connected to the differential gear 33, this movement of the flap tends to rotate the spider 29 in a clockwise direction or in a direction tending to move the camshaft 25 to a neutral position in which all of the valves in the selector valve 26 are closed. When the flap 36 has moved sufficiently, the selector valve 26 will be closed and the liquid on opposite sides of the piston 40 will be trapped in the cylinder 39 with the result that the flap is locked in position. By utilizing gearing in the differential between the flap and the control handle 13 of proper ratio, the flap 36 can be caused to move angularly a distance equal to the angular displacement of the handle 13 or, if desired, in a ratio other than one to one.

When the flap is to be moved in the opposite direction from that described above, the handle 13 can be moved upwardly in a clockwise direction and the same sequence of operations, but in a reverse direction, will take place.

The above-described apparatus is suitable for controlling the operation of elements at a remote point which are capable of being moved only through relatively small angles. The device can be modified so as to permit the remote control of devices which must be displaced angularly through angles of 360° or more. A typical form of device for this purpose is illustrated in Figure 3 of the drawings. This device includes a selector valve 56 having its cam actuating shaft 57 provided with a non-circular portion 58 for receiving non-rotatably a tubular sleeve or shaft 59. The shaft 59 carries an outer pulley 60 of generally dished cross-section providing a cavity 61 therein for receiving a portion of the differential mechanism 62. Another similarly dished pulley 63 is also supported on the shaft 59 for enclosing the remainder of the differential 62.

The differential disclosed in Figure 3 is similar to that described in Figures 1 and 2 inasmuch as it includes a differential gear 64 fixed to the interior of the pulley 60 and meshing with a differential idler pinion 65 that is supported on the spider 66. The differential idler pinion 65 meshes with another idler pinion 67 also supported rotatably on the spider and meshing with the differential gear 68. The spider 66 is fixed to the shaft 59.

The pulley 60 may be suitably connected to a drive pulley (not shown) so that they may be rotated in unison. The pulley 63 may be connected by means of a suitable belt (not shown) to a motor, for example, a rotary hydraulic motor, or to the element actuated thereby, as described above.

Inasmuch as the pulley 63 is rotated by the motor or the member driven by the motor in the reverse direction to that of the pulley 60, the pulley 60 may be rotated as far as desired, and even continuously, while its effect on the selector valve is offset in the opposite direction by the pulley 63 acting on the differential to return the selector valve to its neutral position in which all of the valves in the selector valve 56 are closed.

Either of the above types of differentials may be embodied in a system for controlling the movements of all of the wing flaps on an airplane by a single control member. By utilizing a differential control mechanism of the type described above for each wing flap and utilizing a common control member for all of the differentials, all of the wing flaps may be adjusted into the same angular relationship with respect to the wings of the airplane. A system of this type is disclosed diagrammatically in Fig. 7. This system includes a control lever 70 suitably mounted in the cockpit of an airplane which is fixed to a shaft 71 that carries a pair of pulleys 72 and 73. These pulleys are connected, respectively, by means of belts 74 and 75 to the differential mechanisms 76 and 77 of the type disclosed in Figure 3 and described above. The differentials 76 and 77 control separate selector valves 78 and 79, respectively, which are connected by means of suitable conduits to the hydraulic motors 80 and 81. The hydraulic motors are, in turn, connected to the wing flaps 82 and 83, respectively, for rocking these flaps about their shafts 84 and 85, respectively. The shafts are provided with the pulleys 86 and 87 which are connected back to the differentials 76 and 77, respectively, by means of the belts 88 and 89. The pressure fluid ports of each of the selector valves 78 and 79 are connected by the conduits 90 and 91 to the pressure side of a pump 92 that may be driven by the airplane engine to supply fluid pressure for actuating the wing flaps. The return ports of the selector valves 78 and 79 are connected by means of the conduits 93 and 94 to the intake side of the pump 92. It will be understood that the hydraulic system may be provided with suitable relief and unloader valves and an accumulator, in the usual way.

In operation, when the control lever 70 is rocked in one direction, the differentials 76 and 77 are actuated simultaneously to open the selector valves to supply fluid to the cylinders 80 and 81 to move the wing flaps 82 and 83 in the same direction. Movement of the wing flaps 82 and 83 resets the differentials 76 and 77 in a reverse direction until the selector valves 78 and 79 return to neutral position, cutting off flow of liquid to and the discharge of liquid from the cylinders 80 and 81. At this time, both of the wing flaps will have been displaced equal distances in proportion to the displacement of the control handle 70. The wing flaps are actually operated independently and they may not move simultaneously to their desired angular relationship inasmuch as the air pressure or friction acting on one of the flaps may retard its movement to a greater extent than the movement of the other flap. However, both of the flaps will come to rest in the same angular relationships because the supply of pressure liquid to the individual motors is not discontinued until the differential associated with the motor has been returned a distance equal to its displacement by the control lever.

Figure 8:
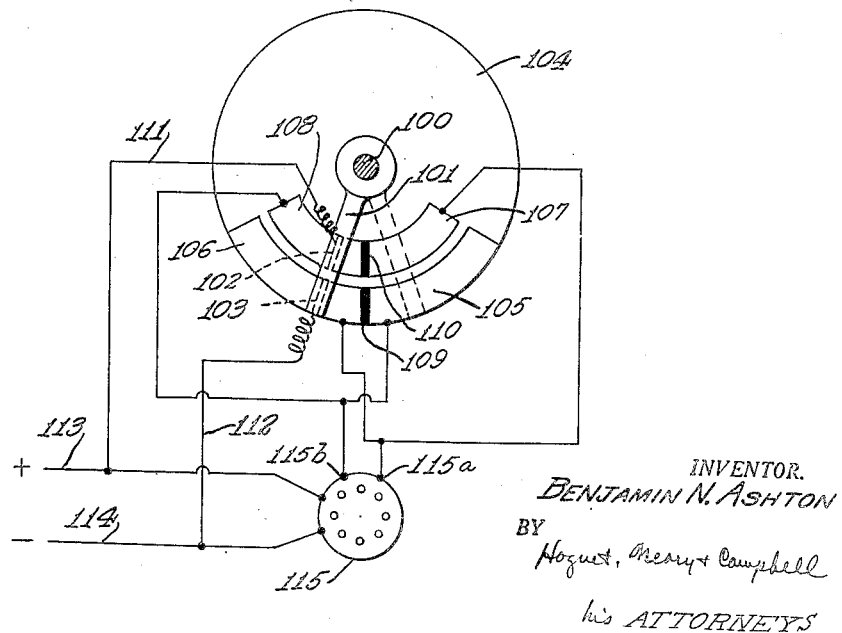
Figure 8 is a diagrammatic showing of a commutator and reversing electric motor circuit adapted for use with the control system embodying the present invention.

The invention has been described above with reference to the use of a valve for controlling the supply of power to an hydraulic motor. The invention is not restricted, however, to hydraulic systems, alone, but may be applied to systems for controlling the operation of one or more reversible electric motors. Thus, instead of utilizing a selector valve for the control of the motors, the differential mechanism may be used to control a switching device including a commutator and arcuate conducting segments on opposite sides of a narrow dead segment in order to supply electric energy to a reversing type of electric motor. A typical commutator and reversing motor system is disclosed diagrammatically in Figure 8. This form of device includes a shaft 100 upon which is mounted a differential mechanism of the type disclosed in Figures 1 and 2 or Figure 3. The shaft 100 is also provided with an insulating commutator arm 101 that is provided with axially spaced narrow brush members 102 and 103. The commutator arm 101 rotates in front of a nonconducting member, such as the disc 104, which carries adjacent one edge an outer pair of spaced apart conducting segments 105 and 106 and a radially inwardly disposed pair of conducting segments 107 and 108. The adjacent ends of the segments 105 and 106 are spaced apart and a narrow non-conducting segment 109 is interposed therebetween. A similar non-conducting segment 110 is interposed between the adjacent ends of the segments 107 and 108.

The commutator brushes 102 and 103 are connected by means of suitable conductors 111 and 112 to the power lines 113 and 114, respectively. These power lines are also connected to the field winding of a single phase reversing motor 115. One contact 115a of the armature of the motor 115 is connected to the segments 106 and 107. The other armature contact 115b is connected to the commutator segments 105 and 108.

When the commutator arm 101 is in a position such that the brushes 102 and 103 are in contact with the dead segments 110 and 109, respectively, the motor is deenergized. When the commutator arm 101 is moved to the position shown in Figure 8, the motor is energized for movement in one direction. When the commutator arm is moved to the dotted line position, the direction of operation of the motor 115 is reversed.

It will be understood that the commutator arm 101 is responsive to the movement of a control member (not shown) and also to the operation of the motor as described above through suitable connections, also not shown.

From the preceding description of typical forms of devices embodying the present invention, it will be understood that a control system has been provided that permits effective follow up of the movement of the control member by another member driven by a motor of suitable power. It will be understood that inasmuch as the differential mechanism described above is responsive to the motion imparted by the motor and the control member, the power of the motor is unimportant and equal displacements of the driven member or members can be obtained, even though the motors connected thereto are of widely varying power.

It will be understood, also, that devices of the type embodying the present invention are susceptible to considerable modification in the type of differential used therein and the drive connections between the control member and the differential and between the differential and the remotely controlled element or the motor for actuating the same. Therefore, the forms of the invention disclosed herein should be considered as illustrative and not as limiting the scope of the following claims.

I claim:

1. A remote control mechanism, comprising a reversible hydraulic motor, a selector valve mechanism connected to said motor having a cam shaft member rotatably in one direction from a neutral position to supply liquid to said motor to drive it in one direction, and rotatably in the opposite direction from a neutral position to supply liquid to said motor to drive it in the opposite direction, said cam shaft member in neutral position controlling said valve to shut off the supply of liquid to and discharge of liquid from said motor, a shaft fixed to said cam shaft member in axial alignment therewith, a plate fixed to said shaft, said plate having staggered communicating recesses in opposite sides thereof to provide an opening through said plate, a pair of differential gears rotatably mounted on said shaft on opposite sides of said plate, idler pinions rotatably mounted in said recesses and meshing with each other through said opening, each of said pinions meshing with one of said differential gears, a control member connected to one of said differential gears for rotating said plate and said cam shaft member out of said neutral position to start said motor, and means connecting said motor to the other differential gear for returning said plate and said cam shaft member to neutral position upon operation of said motor.

2. A remote control mechanism, comprising a reversible motor, a control mechanism connected to said motor having a rotary member rotatable in one direction from a neutral position to supply energy to said motor to drive it in one direction and rotatable in the opposite direction from said neutral position to supply energy to said motor to drive it in the opposite direction, said rotary member, when in neutral position, shutting off supply of energy to said motor, a shaft fixed to said rotary member in axial alignment therewith, a plate fixed to said shaft, a pair of differential gear members rotatably mounted on said shaft on the opposite sides of said plate, idler pinions mounted on opposite sides of said plate with their axes substantially parallel to said shaft, each pinion being in mesh with one of said differential gear members, said plate having communicating recesses in its opposite sides in which said pinions are mounted in meshing relation, a control member connected to one of said differential gear members for rotating said plate and said rotary member out of said neutral position to start said motor, and means connecting said motor to the other differential gear member for returning said plate and said rotary member to neutral position upon operation of said motor.

3. A remote control mechanism, comprising a reversible motor, a control mechanism connected to said motor having a rotary member rotatable in one direction from a neutral position to supply energy to said motor to drive it in one direction, and rotatable in the opposite direction from a neutral position to supply energy to said motor to drive it in the opposite direction, said rotary member, when in neutral position, shutting off the supply of energy to said motor, a shaft fixed to said rotary member in axial alignment therewith, a plate fixed to said shaft, a pair of differential gear members rotatably mounted on said shaft on opposite sides of said plate, communicating recesses in partially offset relation in opposite sides of said plate to provide an opening therebetween through said plate, idler pinions mounted in said recesses and meshing with each other through said opening and connecting said differential gear members, hollow pulleys fixed to the outer sides of said differential gear members and having inwardly extending rim portions overlying and enclosing said gears and said plate, a control member connected to one of said pulleys for rotating said plate and said rotary member out of said neutral position to start said motor, and means connecting said motor to the other pulley for returning said plate and said rotary member to neutral position upon operation of said motor.

BENJAMIN N. ASHTON.

REFERENCES CITED

The following references are of record in the file of this patent:

UNITED STATES PATENTS

| Number | Name | Date |
| --- | --- | --- |
| 525,693 | Cole | Sept. 11, 1894 |
| 588,856 | De Dion | Aug. 24, 1897 |
| 1,729,173 | Marfaing | Sept. 24, 1929 |
| 1,959,786 | Hodgkinson | May 22, 1934 |
| 1,993,475 | Butterfield | Mar. 5, 1935 |
| 2,019,264 | Koons | Oct. 29, 1935 |
| 2,105,473 | Dean | Jan. 18, 1938 |
| 2,166,206 | Benson | July 18, 1939 |
| 2,224,725 | Felt | Dec. 10, 1940 |
| 2,226,821 | Kempson | Dec. 31, 1940 |
| 2,376,320 | Butrovich et al. | May 22, 1945 |
| 2,404,552 | Werff | July 23, 1946 |
| 2,412,366 | Spencer | Dec. 10, 1946 |

FOREIGN PATENTS

| Number | Country | Date |
| --- | --- | --- |
| 130,213 | Great Britain | July 31, 1919 |
| 516,720 | Great Britain | Jan. 10, 1940 |